United States Patent [19]
Aoyama

[11] Patent Number: 6,037,975
[45] Date of Patent: Mar. 14, 2000

[54] IMAGE SENSOR FOR MONITORING VEHICLE'S FORWARD VIEW AND METHOD FOR SETTING ASPECT RATIO FOR PHOTOSENSITIVE PORTION OF SUCH IMAGE SENSOR

[75] Inventor: Chiaki Aoyama, Wako, Japan

[73] Assignee: Honda Giken Kogyo Kabushiki Kaisha, Tokyo, Japan

[21] Appl. No.: 08/920,952

[22] Filed: Aug. 29, 1997

[30] Foreign Application Priority Data

Aug. 30, 1996 [JP] Japan ................................. 8-229642

[51] Int. Cl.$^7$ ....................................... H04N 7/18
[52] U.S. Cl. .......................... 348/113; 348/148; 348/149
[58] Field of Search .................... 348/140, 148, 348/149, 157, 158, 113

[56] References Cited

U.S. PATENT DOCUMENTS

| | | | |
|---|---|---|---|
| 4,539,598 | 9/1985 | Dietrich et al. | 348/319 |
| 5,087,969 | 2/1992 | Kamada et al. | 348/119 |
| 5,416,598 | 5/1995 | Ezaki | 386/38 |
| 5,794,090 | 8/1998 | Oshima et al. | 396/435 |
| 5,850,254 | 12/1998 | Takano et al. | 348/148 |
| 5,892,855 | 4/1999 | Kakinami et al. | 382/291 |

FOREIGN PATENT DOCUMENTS

| | | |
|---|---|---|
| 5-219444 | 8/1993 | Japan . |
| 6-205298 | 7/1994 | Japan . |

OTHER PUBLICATIONS

English language Abstract of JP 5–219444.
English language Abstract of JP 6–205298.
Takuya Imaide, et al., "A Digital Video Camera with an Arbitrary Aspect Ratio," IEEE Transactions on Consumer Electronics, vol. 37, No. 3, whole document, Aug. 1991.

*Primary Examiner*—Tommy P. Chin
*Assistant Examiner*—John Voisinet
*Attorney, Agent, or Firm*—Lyon & Lyon LLP

[57] ABSTRACT

The photosensitive portion of an image sensor which is used for monitoring a forward view of a vehicle on a roadway is formed that is horizontally elongated with an aspect ratio in a range from 1:1.8 to 1:3.1 adjustable in correspondence with the design speed of the roadway, the minimum radius of curvature R, the maximum longitudinal slope S of the roadway, the braking distance D of the vehicle, and the number of lanes to be imaged. Here, the aspect ratio of the photosensitive portion is set at a ratio within a range from 1:1.8 to 1:3.1 in correspondence with the conditions of the design speed of the roadway and of the number of lanes to be imaged including the lane in which the vehicle is driving.

13 Claims, 5 Drawing Sheets

Fig. 1

| Design Speed (Km/h) | Minimum Radius of Curvature R (m) | Maximum Longitudinal Slope S (%) | Braking Distance D (m) | Required Horizontal Angle of View θH (°) | | | | Required Vertical Angle of View θv1 + θv2 = θv (°) | Aspect Ratio (1 : ) | | | |
|---|---|---|---|---|---|---|---|---|---|---|---|---|
| | | | | Vehicle's Lane | One Additional Neighboring Lane | Two Additional Neighboring Lanes | Three Additional Neighboring Lanes | | Vehicle's Lane | One Additional Neighboring Lane | Two Additional Neighboring Lanes | Three Additional Neighboring Lanes |
| 120 | 570 | 2 | 193 | 20 | 22 | 24 | 26 | 15 | 1.3 | 1.5 | 1.6 | 1.7 |
| 100 | 380 | 3 | 146 | 23 | 26 | 29 | 31 | 16 | 1.5 | 1.7 | 1.8 | 2.0 |
| 80 | 230 | 4 | 106 | 28 | 31 | 35 | 39 | 17 | 1.6 | 1.8 | 2.1 | 2.3 |
| 60 | 120 | 5 | 72 | 36 | 41 | 46 | 50 | 18 | 2.0 | 2.3 | 2.6 | 2.8 |
| 50 | 80 | 6 | 45 | 36 | 43 | 50 | 56 | 19 | 1.9 | 2.3 | 2.6 | 2.9 |
| 40 | 50 | 7 | 33 | 43 | 52 | 61 | 69 | 20 | 2.2 | 2.6 | 3.1 | 3.5 |
| 30 | 30 | 8 | 24 | 52 | 63 | 73 | 82 | 21 | 2.5 | 3.0 | 3.5 | 3.9 |
| 20 | 15 | 9 | 15 | 66 | 82 | 95 | 105 | 23 | 2.9 | 3.6 | 4.1 | 4.6 |

Categories I, II, III, IV, V indicated across aspect ratio columns.

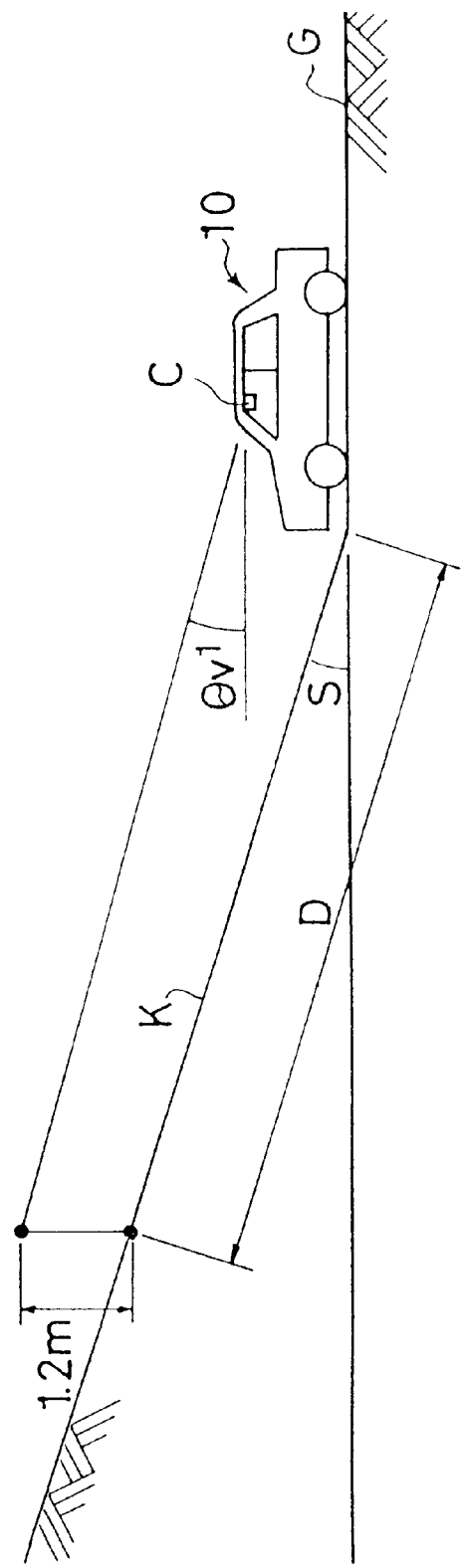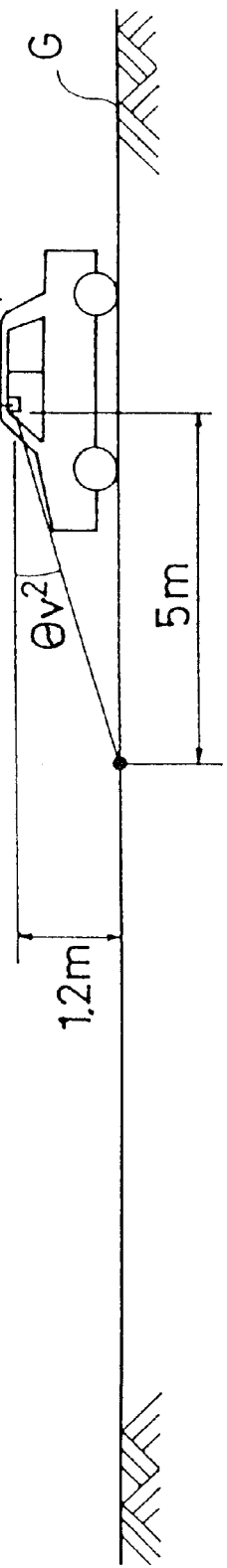
Fig. 4A
Fig. 4B

IMAGE SENSOR FOR MONITORING VEHICLE'S FORWARD VIEW AND METHOD FOR SETTING ASPECT RATIO FOR PHOTOSENSITIVE PORTION OF SUCH IMAGE SENSOR

FIELD OF THE INVENTION

The present invention relates to an image sensor for monitoring the forward view of a vehicle and particularly to an image sensor which can be used effectively in an automatic navigation system for an automobile. Furthermore, the present invention relates to a method for setting an aspect ratio for a photosensitive portion of such image sensor.

BACKGROUND OF THE INVENTION

An automatic navigation system, which is incorporated in an automobile, controls such operations as braking actuation when an obstacle is detected on the roadway ahead of the vehicle and steering actuation to follow a white guiding line which is provided along the roadway or to follow another vehicle cruising ahead. For these control operations, the detection of respective objects such as an obstacle is carried out by monitoring the forward view of the vehicle with an image sensor and by processing the data of images which are obtained in the monitoring. As such an image sensor, most popularly used is a video camera of the NTSC color system, i.e., an ordinary color video camera, whose aspect ratio is 3:4.

If the curves of the roadway are taken into consideration, a horizontal angle of view of 20 to 100 degrees is required for the monitoring of the forward view. If this horizontal angle of view is maintained by an NTSC camera, then the images obtained must include areas in the upper and lower portions thereof, e.g., skies, which are not necessary as information for the operation of the automatic navigation system. These upper and lower portions of the images constitute an unwanted load for the image processing operation of the system.

Hi-Vision camera, another type of video camera, has an aspect ratio of 9:16. If a Hi-Vision camera is applied alternatively as image sensor of the automatic navigation system, then the unwanted upper and lower portions of the images are reduced accordingly. However, for the automatic navigation system to operate safely and securely without a fail, when the vehicle approaches a curve along the roadway, the horizontal angle of view must be wide enough to take in a large section of the curvature of the roadway in the images still. In such cases, the images must include yet substantially unwanted upper and lower portions. Hi-Vision cameras generally have image sensors (or photosensitive portions) whose resolutions are higher than those of NTSC cameras, so the automatic navigation system with a Hi-Vision camera can obtain more data from the detailed images than with an NTSC camera. However, the incorporation of a Hi-Vision camera makes the system comparatively expensive.

Japanese Laid-Open Patent Publication No. H5(1993)-219444 and Japanese Laid-Open Patent Publication No. H6(1994)-205298 disclose an imaging device or an image sensor which can change the aspect ratio between 3:4 and 9:16 as the need arises. Because the change of the aspect ratio is limited to these two ratios, it is impossible for the automatic navigation system to obtain the images in an aspect ratio which is horizontally wider than 9:16. In this respect, it is possible to construct a system or mechanism which can shut out the upper and lower portions of the imaging device by applying similar technology disclosed in the above mentioned patent publications so that the image sensor can generate the images in a wider aspect ratio. However, imaging devices or image sensors constructed in such a way are substantially large in size and expensive to produce.

Furthermore, the above mentioned automatic navigation system requires a camera which is capable of setting the aspect ratio variably and appropriately for monitoring in performing various types of automatic navigation. For example, it is necessary for the camera to have a yet greater horizontal angle of view when the system expects a relatively sharp curve on the road. Thus, for the purpose of performing automatic navigation securely and safely, there has been a need for a method for setting the aspect ratio in correspondence with the condition of the roadway.

SUMMARY OF THE INVENTION

The present invention is conceived to solve the problems mentioned above. It is an object of this invention to provide an image sensor in a relatively small size but with a substantially wide aspect ratio so that this image sensor can monitor only a portion of a view which is necessary and appropriate for automatic navigation of an automobile.

Another object of this invention is to provide a method for setting an optimal aspect ratio for the photosensitive portion of such image sensor.

These objectives are realized by an image sensor of the present invention, which image sensor is mounted in a vehicle and is used for monitoring the forward view of the vehicle on a roadway. This image sensor includes a horizontally elongated photosensitive portion which has an aspect ratio in a range from 1:1.8 to 1:3.1.

With this image sensor, the automatic navigation system can acquire a sufficient horizontal angle of view necessary for the operation of automatic navigation covering such cases as appearance of a curve or of a plurality of lanes. At the same time, the images being monitored by the image sensor do not include any view which is not necessary for the operation of automatic navigation such as skies at the upper portions of the images.

It is preferable that the aspect ratio of the photosensitive portion be set at approximately 1:1.8. This aspect ratio, 1:1.8, is the most optimal ratio appropriate for monitoring on a highway, where automatic navigation is most suitable. Thus, by setting the aspect ratio at 1:1.8, the system can acquire an image sensor which is optimal for automatic navigation.

It is also preferable that the aspect ratio of the photosensitive portion of the image sensor be set at a ratio within a range from 1:1.8 to 1:3.1 in correspondence with the conditions of the design speed of the roadway and of the number of lanes to be imaged including the lane in which the vehicle is driving. In obtaining an optimal aspect ratio, considerations should be given to the minimum radius of curvature and the maximum longitudinal slope of the roadway and the braking distance of the vehicle, etc. Here, the minimum radius of curvature and the maximum longitudinal slope of the roadway are determined in correspondence with the design speed of the roadway in the road construction statute, and the braking distance is determined in correspondence with the speed of the vehicle, which can be also determined directly by the design speed. Therefore, the optimal aspect ratio can be determined in correspondence with the design speed and the number of lanes to be imaged including the lane in which the vehicle is driving.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention and wherein:

FIG. 1 is a table of aspect ratios listed in correspondence with the design speeds, etc. of roadways;

FIG. 4A is a reference drawing for determining a required ascending vertical angle of view;

FIG. 4B is a reference drawing for determining a required descending vertical angle of view;

DESCRIPTION OF THE PREFERRED EMBODIMENTS

Figure 2:
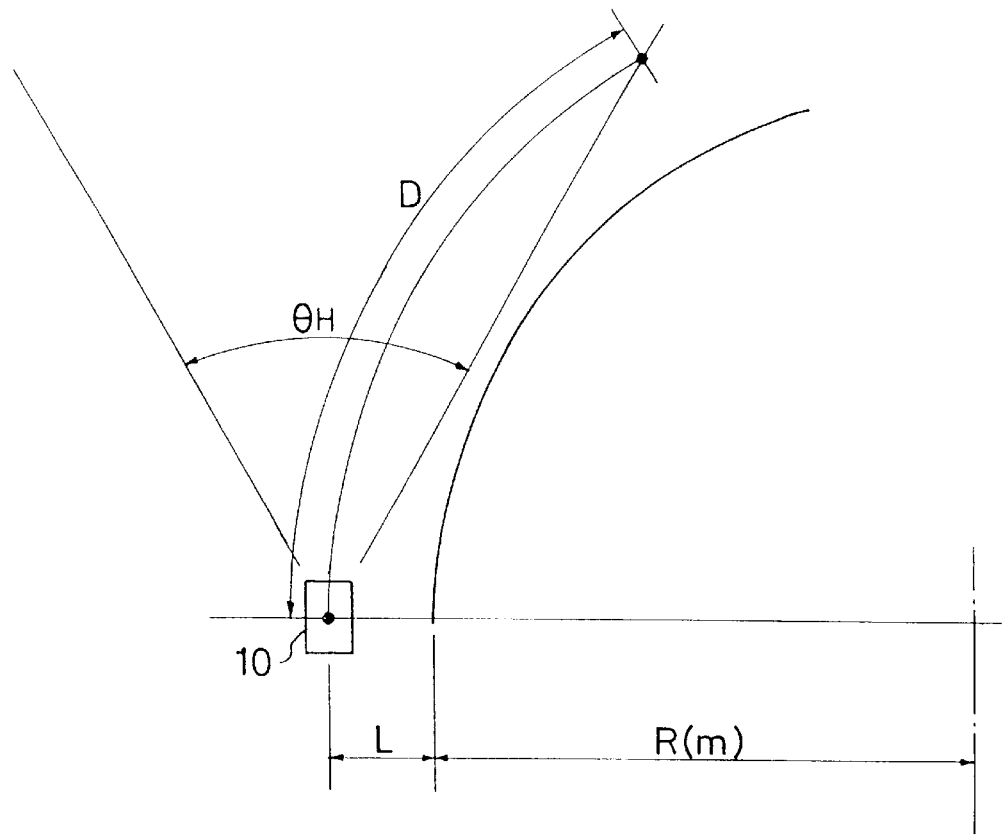
FIG. 2 is a reference drawing for determining a required horizontal angle of view.

With reference to the accompanying drawings, an image sensor for monitoring the forward view of a vehicle, which is a preferred embodiment of the present invention, is described as applied to a camera used in an automatic navigation system. For automatically navigating an automobile, the navigation system must monitor the forward view of the vehicle. For this reason, a camera C is mounted above the driver seat on the ceiling of the cabin of an automobile 10 which is designed for automatic navigation as shown in FIGS. 4A, and 4B so that the forward view of the vehicle is monitored by the camera. This camera C comprises an imaging device of metal oxide semiconductor (MOS) in a photosensitive portion.

The images being taken by the camera C are processed by an image processor (not shown in the drawings), and the control of actuators for steering, braking, etc. of the vehicle 10 is based on the data acquired from this image processing. For executing the automatic navigation safely, it is important for the image processor to execute the image processing as quickly as possible. For this reason, the photosensitive portion of the camera C is horizontally elongated so that the images monitored by the camera will not include skies and the like whose information is not necessary for carrying out the automatic navigation. In this way, the speed of the image processing is increased.

The imaging field (horizontal angle of view θH and vertical angle of view θV required) of the vehicle's forward view necessary for automatic navigation varies in correspondence with the speed of the vehicle 10 and the condition of the roadway, for example, whether or not there is a curve or a slope ahead. The reason is that if there is an obstacle ahead of the vehicle 10 at a distance, the automatic navigation system must recognize it after taking the image of it by the camera C so that it can stop the vehicle 10 to avoid a collision. If the roadway on which the vehicle 10 is driving is a flat and straight one-lane road and if there is an obstacle ahead, then that obstacle will appear straight ahead of the vehicle 10. In such cases, it is all right to have a small imaging field.

However, if the roadway curves and if an obstacle is located beyond the curve, then it is necessary for the images to be widened horizontally to capture the obstacle. Also, if the roadway starts to ascend, then the images must include somewhat more of a view in the upper direction. Furthermore, while the speed of the vehicle 10 increases, the braking distance also increases. In this case, the imaging field must be made wider so as to recognize an obstacle which may exist in the distance.

As such, the imaging field required of the automatic navigation system is defined by the minimum radius of curvature R and the maximum longitudinal slope S of the roadway and the braking distance D of the vehicle 10. Here, the minimum radius of curvature R and the maximum longitudinal slope S are defined in correspondence with the design speed of the roadway in the road construction statute or other similar data concerning the proper speed on that roadway or a portion of that roadway.

At first, a description is made of the calculation of the braking distance D in meters. The braking distance D is calculated by the following formula, Formula 1, where the free running time $\Delta t$ is 1 second; the deceleration $\alpha$ is 0.5 G; and the velocity V prior to deceleration is 20 kilometers per hour (km/h) above the design speed.

$$D = \frac{V}{3.6}\Delta t + \frac{\left(\frac{V}{3.6}\right)^2}{2 \cdot 9.8 \cdot \alpha} \quad \text{Formula 1}$$
$$= 0.278V + 0.00787V^2$$

Second, a description is made of the calculation of the required horizontal angle of view θH in degrees. As shown in FIG. 2, the required horizontal angle of view θH is considered as equal to the angle by which a determination is possible when the obstacle located at a distance D is in the lane where the vehicle 10 is driving along a curve. Calculation is made by the following formula, Formula 2, which includes variables R and L. Here, L is the deviation in meters from the minimum radius of curvature R of the roadway to the center of the lane in which the vehicle 10 is driving.

$$\theta H = 2 \cdot \arctan \frac{\frac{L}{R} + 1 - \cos\frac{D}{R}}{\sin\frac{D}{R}} \quad \text{Formula 2}$$

Figure 3A:
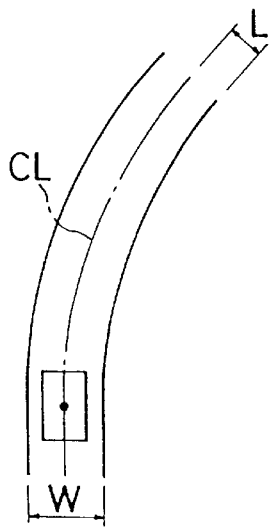
FIG. 3A is another reference drawing for determining a required horizontal angle of view.
Figure 3B:
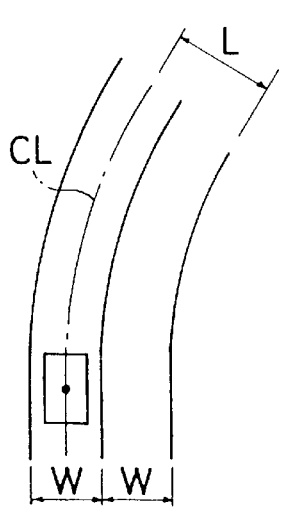
FIG. 3B is still another reference drawing for determining a required horizontal angle of view.
Figure 3C:
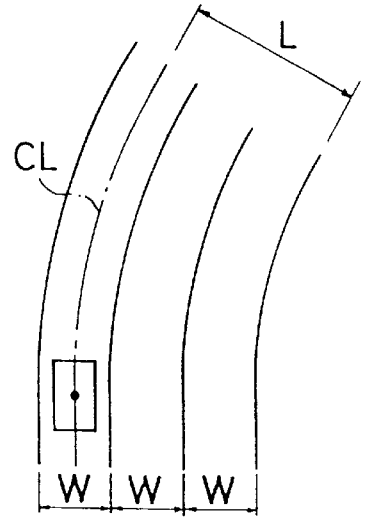
FIG. 3C is yet another reference drawing for determining a required horizontal angle of view.

The deviation L varies in correspondence with the number of lanes and their widths which are defined in correspondence with the design speed of the roadway. As shown in FIG. 3A, if the roadway has only one lane, then the deviation L is the distance from the center CL of the roadway to the centripetal edge of the roadway, i.e., L=W/2, where W is the width of the roadway. Furthermore, as shown in FIG. 3B, if the roadway has two lanes, and the vehicle 10 is driving in the centrifugal lane, then the deviation L is the distance W+W/2 comprising the width W of the centripetal lane and half the width W/2 of the centrifugal lane. Likewise, as shown in FIG. 3C, if the roadway has three lanes, and the vehicle 10 is driving in the most centrifugal lane, then the deviation L is the distance 2W+W/2 comprising the two widths 2W of the centripetal lanes and half the width W/2 of the centrifugal lane.

The above mentioned, required horizontal angle of view θH is calculated with W =3.5 meters for roadways with a design speed of 80 km/h, W=3.25 meters for roadways with a design speed of 60 km/h, W=3.0 meters for roadways with a design speed of 40 or 50 km/h, or W=2.75 meters for roadways with a design speed of 20 km/h.

With reference now to FIG. 4, a description will be made of the calculation of the required vertical angle of view θV. First, FIG. 4A shows the ascending vertical angle of view $\theta V^1$ which is the angle of the upper section of the vertical angle of view above the center of the camera C. The ascending vertical angle of view θV' is the angle which enables recognition of a point located at the braking distance D ahead of the vehicle 10 and 1.2 meters above the surface of the roadway when the vehicle 10 is at the start of an uphill incline K which has a maximum longitudinal slope S (%) as, for example defined in the road construction statute. This 1.2 meters is the height of the camera C above the ground G. The following formula, Formula 3, gives the ascending vertical angle of view $\theta V^1$.

$$\theta v^1 = \arctan\frac{D \cdot S + 1.2}{D} \qquad \text{Formula 3}$$

Also, the descending vertical angle of view $\theta V^2$ is the angle of the lower section of the vertical angle of view below the center of the camera C, and it is the angel which enables recognition of a point located on the surface of the ground G at 5 meters ahead of the camera C. The following formula, Formula 4, gives the descending vertical angle of view $\theta V^2$.

$$\theta V^2 = \arctan\frac{1.2}{5} \qquad \text{Formula 4}$$

Thus, the required vertical angle of view θ v (degree) is calculated by adding the ascending vertical angle of view $\theta V^1$ to the descending vertical angle of view $\theta V^2$.

FIG. 1 is a table of the results of the above mentioned calculations. The design speed of the roadway is categorized in eight steps from 20 km/h to 120 km/h as seen in the left-most column; and the minimum radius of curvature R, the maximum longitudinal slope S, and the braking distance D are all listed for each design speed, respectively. These parameters are applied to the above Formulas 1 through 4 for the calculations of the required horizontal angle of view θH and the required vertical angle of view θV for each design speed. Additionally, in the case that the roadway has a plurality of lanes, the required horizontal angle of view θH is calculated individually with respect to how many lanes are to be imaged (i.e., in accordance with the number of monitored lanes).

The "Vehicle's lane" in the table of FIG. 1 describes the condition where only the lane in which the vehicle is driving is being monitored (i.e., one lane monitoring). The "One additional neighboring lane" in the table describes the condition that at least one neighboring lane either left or right (as shown in FIG. 3A) in addition to the lane in which the vehicle is driving is being monitored or all these lanes are being monitored (i.e., three lane monitoring). Likewise, the "Two additional neighboring lanes" in the table describes the condition that at least two neighboring lanes either on the left or on the right (as shown in FIG. 3B) in addition to the lane in which the vehicle is driving are being monitored or all these lanes are being monitored (i.e., five lane monitoring). Likewise, the "Three additional neighboring lanes" in the table describes the condition that at least three neighboring lanes either on the left or on the right (as shown in FIG. 3C) in addition to the lane in which the vehicle is driving are being monitored or all these lanes are being monitored (i.e., seven lane monitoring).

After calculating the required horizontal angle of view θH and the required vertical angle of view θV, the aspect ratio, i.e., the ratio of the required vertical angle of view to the required horizontal angle of view, is determined for each of the above mentioned cases which monitors the intended number of lanes, covering a respective required horizontal angle of view θH and a respective required vertical angle of view θV as shown in the right-side columns of the table in FIG. 1. If all the above mentioned conditions of the roadway were to be taken into consideration, then the aspect ratio would require a maximum ratio in a range of 1:3.5 to of 1:4.6 as shown in area V of the table. However, this range is for monitoring three lanes of an avenue which is designed with a design speed of 20 km/h to 40 km./h (or two lanes at 20 km/h to 30 km/h 1:4.1, or one lane at 20 km/h, 1:3.6), so such condition is unrealistic as well as impractical. Therefore, the maximum effective aspect ratio of the image sensor according to the present invention has been selected for a range between 1:1.3 and 1:3.1.

As the condition of the roadway and the speed of the vehicle 10 are always changing, the aspect ratio of the camera C should be adjusted to one of the four major ranges I to IV so that the aspect ratio is alternatively selected from these ranges in correspondence with the driving condition. For example, the aspect ratios of 1:1.3 through 1:1.8 categorized as range I are appropriate for monitoring when the vehicle is on a high-speed highway. In the case where the vehicle is on such a highway and driven by the automatic navigation system, when the design speed is relatively high and the number of lanes to be monitored is relatively small, the aspect ratio of the photosensitive portion is set to 1:1.8 although the images may include some unwanted view in the upper portion thereof.

Also, the aspect ratios of 1:1.9 through 1:2.3 categorized as range II in the table are appropriate for monitoring when the vehicle is driving on an ordinary road in the suburbs. When the vehicle is driven by the automatic photosensitive portion is set at 1:2.3. Likewise, the aspect ratios of 1:2.5 through 1:2.6 categorized as range IV are appropriate for monitoring when the vehicle is on a general city street. Therefore, when the vehicle on a street is driven by the automatic navigation system, the aspect ratio of the photosensitive portion is set at 1:2.6. Furthermore, the aspect ratios of 1:2.8 through 1:3.1 categorized as range IV are appropriate for monitoring when the vehicle is on an avenue. Therefore, when the vehicle on an avenue is driven by the automatic navigation system, the aspect ratio of the photosensitive portion is set at 1:3.1.

Figure 5:
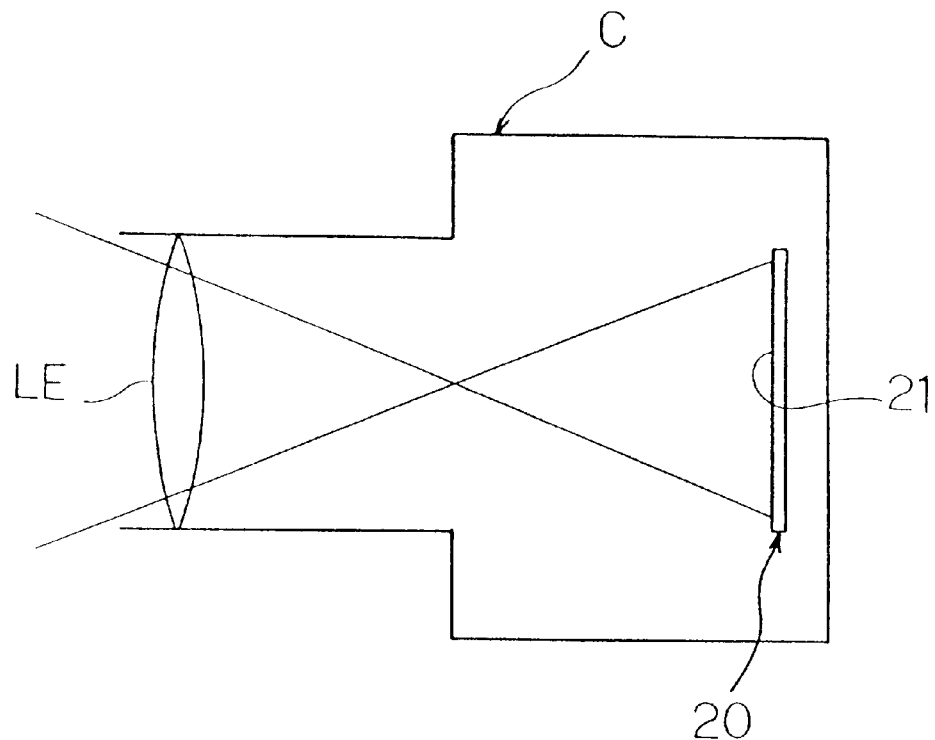
FIG. 5 is a schematic drawing of a camera C, which is an example of an image sensor in accordance with the present invention.
Figure 6:
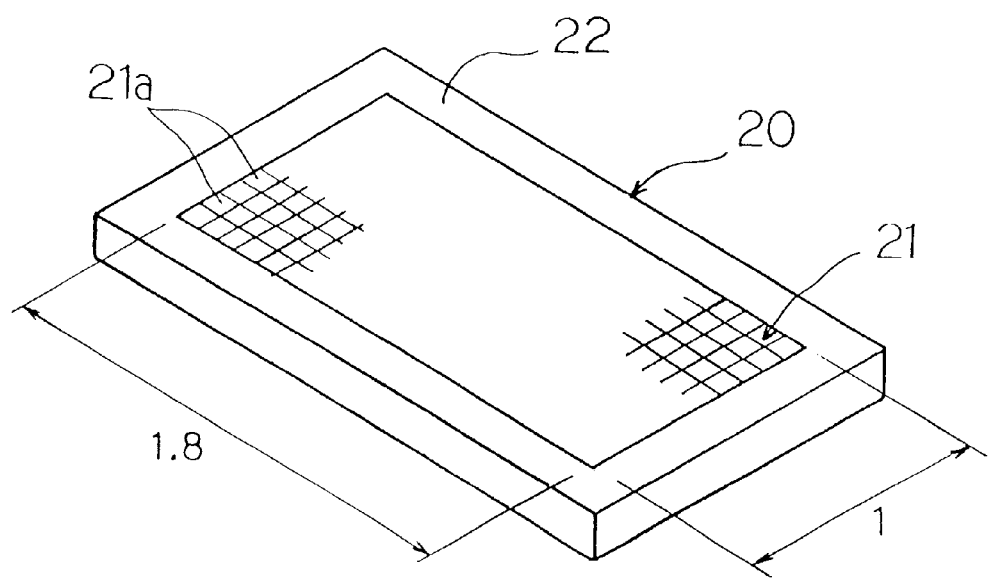
FIG. 6 is a perspective view of a semiconductor chip, which is provided in the camera.

Now, a description will be made of the photosensitive portion of the camera C with reference to FIGS. 5 and 6. As shown in FIG. 5, a semiconductor chip 20 is provided in the camera C, and the semiconductor chip 20 includes a photosensitive portion 21 which comprises a plurality of photosensitive elements 21a on a surface thereof. Light coming in through a lens LE is received on the photosensitive portion 21, which is positioned at the center on the surface of the semiconductor chip 20, and a portion 22 which includes electrical circuits for the photosensitive elements 21a of the photosensitive portion 21 is provided around the photosensitive portion 21 on the surface.

The previously mentioned "aspect ratio of the photosensitive portion" is the aspect ratio of the photosensitive portion 21 and not the aspect ratio of the outer periphery of the semiconductor chip 20. As shown in FIG. 6, an aspect ratio of 1:1.8 is assigned to this photosensitive portion.

The camera C with the aspect ratio set as described above takes the images of the condition of the roadway, and these images do not include in the upper portions thereof any part of a view which is useless to the operation of automatic navigation. As a result, the image processing is executed very quickly so that the automatic navigation system is able to control the vehicle promptly and safely in automatic navigation. As the vertical dimension of the photosensitive portion is made smaller than that of the prior art, the camera C can be made comparatively small. This relatively small camera can be mounted in the cabin without any worry for causing a disturbance to the driver.

Furthermore, as horizontally wide images are obtained with the camera C for monitoring the condition of the roadway, the horizontally swinging mechanism which has been necessary for a camera of the prior art is no longer needed in the automatic navigation system. Therefore, the camera C, which is capable of monitoring a wide view, can be manufactured relatively inexpensively.

The camera C requires a high-resolution imaging device (i.e., a high-resolution photosensitive portion) so that the automatic navigation system will be able to recognize an object which is located at a distance of one hundred meters or more. As such imaging devices are expensive, the more area the photosensitive portion has, the more expensive the camera becomes. Therefore, the photosensitive portion is fabricated in as small a size as possible as described above specifically in an optimal aspect ratio which is necessary for monitoring the condition of the roadway. In this way, the camera with a high-resolution imaging device can be produced with a relatively small cost.

An image sensor for monitoring a vehicle's forward view according to the present invention can be used not only for an automatic navigation system but also for a collision prevention system which detects an obstacle or another automobile ahead of the vehicle to alarm the driver. Furthermore, the photosensitive portion is not limited to the above mentioned MOS imaging device in construction. It may be constructed with an array of photosensitive elements such as CCD imaging device or with a camera tube.

Now, the operation of a preferred embodiment of the present invention will be described with reference to FIG. 7. This figure shows a forward view which is seen from the vehicle 10 driving on a three-lane, one-way highway. In the view, the highway is curving rightward at this moment. The portion surrounded by line F in the figure is the image field which is defined by the photosensitive portion of the camera C with an aspect ratio of 1:1.8. This aspect ratio, 1:1.8, is the most optimal ratio appropriate for the operation of automatic navigation on a highway as described previously, and automatic navigation is most suitable when the vehicle is on a highway because the road conditions of highways are always stable without much change along the way. Thus, the present invention sets the aspect ratio of the image sensor for monitoring the forward view of the vehicle mainly on a highway.

Figure 7:
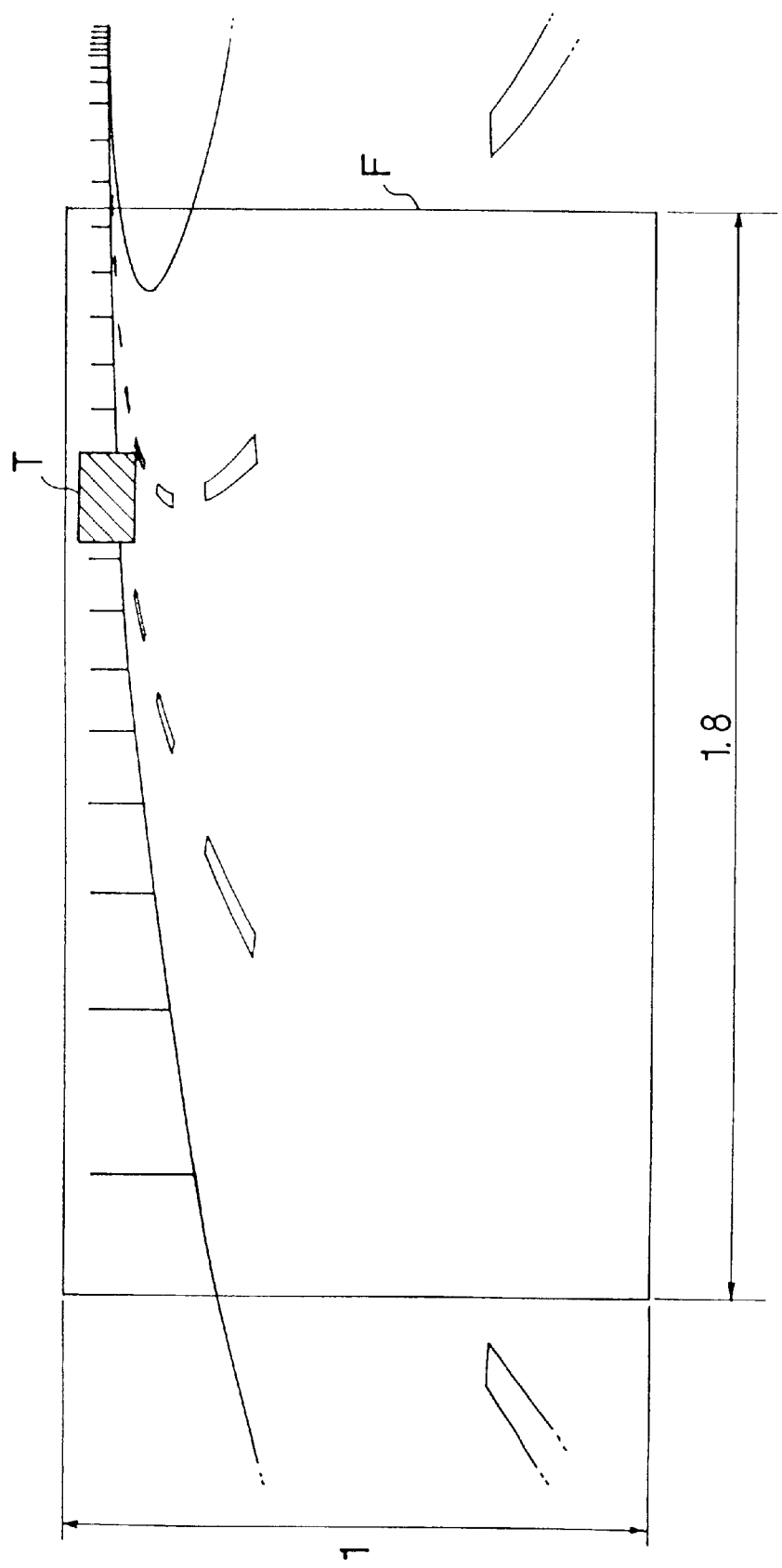
FIG. 7 is a forward view of an vehicle, showing an imaging field in an aspect ratio of 1:1.8.

The highway shown in FIG. 7 has a design speed of 100 km/h and a minimum radius of curvature of 380 meters (i.e., a high standard road). With the camera C constructed as describe above, if another vehicle T, which has a height of 1.23 meters, a width of 1.7 meters, and a length of 4.5 meters, is running 71 meters ahead of the vehicle in the same middle lane, then the vehicle T is monitored as having a size shown as a hatched rectangle in the figure. This image monitored by the camera C does not include the sky, etc. which are way above the surface of the highway and are not necessary for the operation of automatic navigation, but it sufficiently includes a view from immediately forward to the pointing of the curve, thus enabling the system to recognize an obstacle which may be located far ahead.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image sensor for monitoring a forward view of a vehicle traveling on a roadway; comprising
    a horizontally elongated photosensitive portion whose aspect ratio is in a range from 1:1.8 to 1:1.3.1, and
    said aspect ratio being determined within said range based on parameters of a design speed of said roadway and of a number of lanes to be monitored including a lane in which said vehicle is traveling.

2. The image sensor as set forth in claim 1 wherein:
    the aspect ratio of said photosensitive portion is approximately 1:1.8, and
    a forward view of the vehicle traveling on a highway and an expressway is monitored by said photosensitive portion.

3. A method for setting an aspect ratio of an adjustable photosensitive portion of an image sensor for monitoring a forward view of a vehicle traveling on a roadway, comprising the steps of;
    determining a type of the roadway on which said vehicle travels and said forward view of the vehicle is monitored,
    setting a suitable aspect ratio of said photosensitive portion based on parameters of a design speed of said roadway and of a number of lanes to be monitored including a lane on which said vehicle travels, and
    monitoring a forward view of the vehicle by an image sensor having said suitable aspect ratio.

4. The method of setting the aspect ratio as set forth in claim 3 wherein:
    said type of roadway determined is a highway or an expressway; and
    said suitable aspect ratio of said photosensitive portion is set to approximately 1:1.8.

5. The method for setting the aspect ratio as set forth in claim 3 wherein:
    said type of roadway determined is an ordinary road in a suburb; and
    said suitable aspect ratio of said photosensitive portion is set to approximately 1:2.6.

6. The method for setting the aspect ratio as set forth in claim 3 wherein:
    said type of roadway determined is an avenue or city street; and
    said suitable aspect ratio of said photosensitive portion is set to approximately 1:3.1.

7. The method for setting the aspect ratio as set forth in claim 3, 4, 5 or 6 or wherein:

said image sensor is used for monitoring the forward view while said vehicle is set in an automatic navigation.

8. An automatic navigation system for a vehicle on a roadway comprising:

an image sensor for monitoring a forward view of the vehicle on the roadway, said image sensor including a horizontally elongated photosensitive portion whose aspect ratio is in a range from 1:1.8 to 1:3.1, and said aspect ratio being determined within said range based on parameters of a design speed of said roadway and of a number of lanes to be monitored including a lane in which said vehicle is traveling;

a camera incorporating said image sensor;

an image processor for processing images taken by said camera; and a controller for controlling actuators for at least one of steering, braking and acceleration of said vehicle on a basis of data acquired by said image processor.

9. An image sensor for monitoring a forward view of a vehicle driving on a roadway, comprising:

a horizontally elongated photosensitive portion whose aspect ratio is adjustable in a range from 1:1.8 to 1:3.1, means for selecting and adjusting an aspect ratio for said photosensitive portion based on a design speed of said roadway and a number of lanes to be imaged including a lane in which said vehicle is driving.

10. An image sensor as set forth in claim 9, wherein data based on the design speed of said roadway includes a minimum radius of curvature of said roadway and maximum longitudinal slope.

11. An image sensor as set forth in claim 9 or 10, wherein said means for selecting the aspect ratio includes means for determining the braking distance of the vehicle and selecting the aspect ratio based in part on the determined braking distance.

12. An image sensor as set forth in claim 9 or 10 wherein:

an automatic navigation system is provided in the vehicle, and said image sensor is used for monitoring the forward view while said vehicle is operated in an automatic navigation.

13. An image sensor as set forth in claim 12, further comprising:

a camera incorporating said image sensor;

an image processor for processing images taken by aid camera; and a controller for controlling actuators for at least one of steering, braking and acceleration of said vehicle on a basis of data acquired by said image processor.

* * * * *